United States Patent
Schramm et al.

(10) Patent No.: US 9,445,059 B2
(45) Date of Patent: Sep. 13, 2016

(54) IMAGE PROCESSING SYSTEM FOR A VEHICLE

(71) Applicant: Bayerische Motoren Werke Aktiengesellschaft, Munich (DE)

(72) Inventors: Andreas Schramm, Wegshceid (DE); Thilo Baur, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 14/328,246

(22) Filed: Jul. 10, 2014

(65) Prior Publication Data

US 2014/0313409 A1    Oct. 23, 2014

Related U.S. Application Data

(63) Continuation of application No. PCT/EP2012/075526, filed on Dec. 14, 2012.

(30) Foreign Application Priority Data

Jan. 10, 2012    (DE) ........................ 10 2012 200 264

(51) Int. Cl.
*H04N 7/00* (2011.01)
*H04N 7/24* (2011.01)
(Continued)

(52) U.S. Cl.
CPC ............... *H04N 7/24* (2013.01); *G09G 5/006* (2013.01); *G09G 5/026* (2013.01);
(Continued)

(58) Field of Classification Search
CPC ............................ H04N 7/24; B60R 2300/30
USPC ........................................................ 348/148
See application file for complete search history.

(56) References Cited

U.S. PATENT DOCUMENTS

2002/0048322 A1* 4/2002 Yamamoto ........... H04N 5/4401
375/240.12
2003/0184556 A1    10/2003 Hollis et al.
(Continued)

FOREIGN PATENT DOCUMENTS

WO    WO 2011/094537 A2    8/2011

OTHER PUBLICATIONS

International Search Report (PCT/ISA/210) dated Mar. 11, 2013 with English translation (seven pages).
(Continued)

Primary Examiner — Jeffery Williams
(74) Attorney, Agent, or Firm — Crowell & Moring LLP (57) ABSTRACT

An image processing system for a vehicle includes a first unit, a second unit and a video transmission link, which couples the first and second units, in terms of signaling, for transmitting digital video data. The video transmission link transmits digital video image signals having a predefined data format for a respective pixel of a video image, the data format including three blocks, each having a predefined number of bits. The first unit ascertains an uncompressed transformed video image signal suitable for transmission via the video transmission link as a function of a respective first video image signal such that the transformed video image signal has the predefined data format of the video transmission link. The first video image signal represents respective uncompressed first video images of a sequence of first video images, which are provided at a predefined frame rate and which, in each case, have a first image resolution having a predefined number of pixels, wherein in each case four pixel values are assigned to the respective pixels of the first video image. The second unit is designed to again ascertain the first video image signal as a function of the transformed video image signal received via the transmission link.

19 Claims, 5 Drawing Sheets

(51) Int. Cl.
- *G09G 5/02* (2006.01)
- *H04N 9/76* (2006.01)
- *H04L 12/64* (2006.01)
- *H04N 21/4402* (2011.01)
- *G09G 5/00* (2006.01)
- *H04N 7/01* (2006.01)
- *H04N 7/10* (2006.01)
- *H04N 21/414* (2011.01)
- *G09G 5/397* (2006.01)

(52) U.S. Cl.
CPC .......... *H04L 12/6418* (2013.01); *H04N 7/01* (2013.01); *H04N 9/76* (2013.01); *H04N 21/440218* (2013.01); *B60R 2300/30* (2013.01); *G09G 5/397* (2013.01); *G09G 2340/06* (2013.01); *G09G 2340/12* (2013.01); *G09G 2370/02* (2013.01); *G09G 2370/12* (2013.01); *G09G 2380/10* (2013.01); *H04N 7/108* (2013.01); *H04N 21/41422* (2013.01)

(56) References Cited

U.S. PATENT DOCUMENTS

2006/0050787 A1 3/2006 Winger
2007/0263937 A1 11/2007 Rizko

OTHER PUBLICATIONS

German Search Report dated Oct. 10, 2012 with partial English translation (ten pages).
"High Definition (HD) Image Formats for Television Production" EBU European Broadcasting Union, Specification, Tech 3299, Geneva, Jan. 2010, ten pages.
Somers, S. "HD-SDI: More Possibilities than Just Television" Extron, ExtroNews, Summer 2006, 24 pages, Issue 17.2.
"Fujitsu and Inova Help Automakers and Tier-One Suppliers Design and Manufacture High-Performance Graphics Display Systems" Fujitsu Microelectronics America, Inc., Case Study, Feb. 1, 2010, seven pages.
"Digital Automotive Pixel Link Transmitter" Inova Semiconductors, APIX—Video Interface configuration Nov. 21, 2012, 34 pages.

* cited by examiner

IMAGE PROCESSING SYSTEM FOR A VEHICLE

CROSS REFERENCE TO RELATED APPLICATIONS

This application is a continuation of PCT International Application No. PCT/EP2012/075526, filed Dec. 14, 2012, which claims priority under 35 U.S.C. §119 from German Patent Application No. 10 2012 200 264.2, filed Jan. 10, 2012, the entire disclosures of which are herein expressly incorporated by reference.

BACKGROUND AND SUMMARY OF THE INVENTION

The invention relates to an image processing system for a vehicle, including a first unit, a second unit and a video transmission link, which couples the first unit and the second unit in terms of signaling for transmitting digital video data.

In a vehicle, such as in a motor vehicle, an increasing amount of information is provided to the vehicle user and/or vehicle driver by way of visual output devices. However, due to the multitude of visual output devices, which are increasingly designed as displays, it is difficult for a vehicle user and/or vehicle driver to reliably gather the most important information from a number of simultaneously presented individual images and/or video images.

It is the object of the invention to create an image processing system for a vehicle which makes a contribution to improving the depiction of video images.

This and other objects are achieved according to the invention, by providing an image processing system for a vehicle, comprising a first unit, a second unit and a video transmission link, which couples the first unit and the second unit in terms of signaling, for transmitting digital video data. The video transmission link is designed to transmit digital video image signals having a predefined data format for a respective pixel of a video image, the data format comprising three blocks, each having a predefined number of bits. The first unit is designed to transmit an uncompressed, transformed video image signal suitable for transmission via the video transmission link as a function of a respective first video image signal in such a way that the transformed video image signal has the predefined data format of the video transmission link. The first video image signal represents respective uncompressed first video images of a sequence of first video images, which are provided at a predefined frame rate and which in each case have a first image resolution having a predefined number of pixels, wherein in each case four pixel values are assigned to the respective pixels of the first video image. The second unit is designed to again ascertain the first video image signal as a function of the transformed video image signal received via the transmission link.

Advantageously, this allows digital video images, which include an alpha channel in addition to three color channels, for example, to be transmitted in uncompressed form via a video transmission link, which otherwise is only provided for transmission of uncompressed video images having three color channels. Examples of such video transmission links provided for transmitting uncompressed video images having three color channels include, for example, a High Definition Multimedia Interface (HDMI) transmission link, a Digital Visual Interface (DVI) transmission link and/or an Automotive Pixel Link (APIX).

Advantageously, this allows the first video images to be made available for further devices in the vehicle, which are suitably designed, for example, for visually displaying the first video images and/or which are designed to merge the first video images and further video images generated by the further and/or other units to form a fused image. This makes it possible to suitably combine information from different images generated by different sources in a fused image.

In an advantageous embodiment, a first pixel value representing a red color, a second pixel value representing a green color, a third pixel value representing a blue color, and a fourth pixel value representing transparency are assigned to the respective pixel of the first video image. Thus, three color channels and one alpha channel are assigned to the pixel. The alpha channel is an additional channel that represents the transparency of the individual pixels in raster graphics, in addition to the color information. A distinction is made between a direct alpha channel and an external alpha channel. The image processing system according to the invention allows the first video images to have a direct alpha channel, in which the respective transparency information is stored in a separate channel, in addition to the color channels. In the case of a direct alpha channel, a pixel is thus stored using not only three values, for example using a respective value for red, green and blue, but using four values, such as a respective value for red, green, blue and transparency. For storage and/or transmission, no external alpha channel is required in which the transparency information is stored and/or transmitted as a separate file.

In a further advantageous embodiment, the second unit is designed to ascertain an overall video image signal as a function of the first video image signal, which has been ascertained again, and a second video image signal. The second video image signal represents respective second video images of a sequence of second video images, which are provided at a predefined second frame rate and which in each case have a second image resolution having a predefined number of pixels. In each case, three pixel values are assigned to the respective pixels of the second video image. The overall video image signal is ascertained in such a way that the overall video image signal represents respective image-in-image video images of a sequence of image-in-image video images. Advantageously, this allows first and second video images to be merged, so that the image-in-image video image has a higher useful information content and/or less interference than the first and/or second video images. The frame rate and the second frame rate can be selected to be identical. This allows for easy calculation of the overall video image signal. The frame rate and the second frame rate are preferably selected in such a way that a human eye is conveyed a flowing image impression by moving image contents.

In a further advantageous embodiment, the first pixel value representing the red color, the second pixel value representing the green color and the third pixel value representing the blue color are assigned to the respective pixel of the second video image. Advantageously, this allows for easy calculation of the respective image-in-image video images.

In a further advantageous embodiment, the overall video signal is ascertained in such a way that a weighting of an overlay of the respective pixels of the first video image and of the second video image is carried out as a function of the fourth pixel values of the first video image representing the transparency. Advantageously, this allows the respective first video image to be inserted into the respective second video image in such a way that no transitions between the respective first video image and the respective second video image are visible to an observer of the respective image-in-image video images when the image-in-image video images are displayed by way of an output device. Moreover, this makes it impossible for an observer to detect which unit provides which image contents in the respective image-in-image video image.

In a further advantageous embodiment, the first unit is designed to generate the first video image signal. This enables a compact design of the image processing system.

In a further advantageous embodiment, the second unit is designed to generate the second video image signal. Advantageously, this also enables a compact design of the image processing system.

In a further advantageous embodiment, the first unit is designed to convert the respective first video image signal into the transformed video image signal in such a way that the transformed video image signal represents a transformed video image, which has the same pixel values as the first video image and a number of pixels greater by a factor of 4/3 than the first video image and in which in each case three pixel values are assigned to the respective pixels of the transformed video image. Advantageously, this makes it possible with very low computing complexity to convert the first video image signal into the transformed video image signal, so that the transformed video image signal has the predefined data format of the video transmission link. One of the three pixel values can be assigned to the respective block of the three blocks. For example, the number of bits of the blocks can be six or eight. The number of bits can be predefined as a function of a desired value range of the respective pixel values.

In a further advantageous embodiment, the first unit is designed to convert the respective first video image signal into the transformed video image signal in such a way that three consecutive pixels of the first video image in each case are covered by four consecutive pixels of the transformed video image. Advantageously, this allows for the first video image signal to be converted into the transformed video image signal using only very low computing complexity. Moreover, this has the advantage that a proportion of pixel values requiring buffering can be minimized.

In a further advantageous embodiment, an order is assigned to the pixel values of the first video image, and the first unit is designed to convert the respective first video image signal into the transformed video image signal in such a way that the pixel values of the transformed video image have the same order. Advantageously, this allows for the first video image signal to be converted into the transformed video image signal using only very low computing complexity. Moreover, this has the advantage that no resorting of the pixel values is required, and thus any necessary buffering of the pixel values can be eliminated.

Other objects, advantages and novel features of the present invention will become apparent from the following detailed description of one or more preferred embodiments when considered in conjunction with the accompanying drawings.

DETAILED DESCRIPTION OF THE DRAWINGS

Elements that are identical in terms of design or function are denoted by identical reference numerals throughout the figures.

Figure 1:
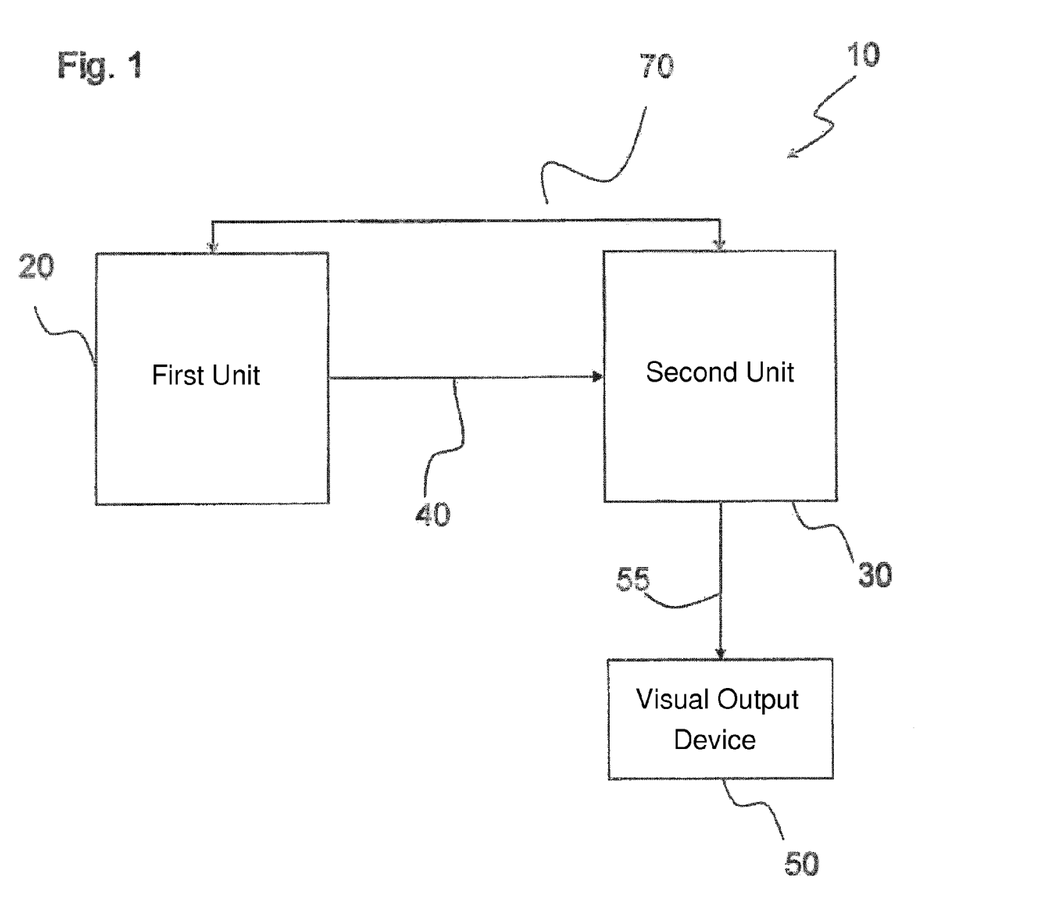
FIG. 1 is a block diagram illustrating an exemplary embodiment of an image processing system.

FIG. 1 shows an image processing system 10 for a vehicle. The vehicle can be designed as a motor vehicle, for example. The image processing system 10 comprises a first unit 20, a second unit 30 and a video transmission link 40.

The video transmission link 40 couples the first unit 20 and the second unit 30 in terms of signaling for transmitting digital video data.

For example, the video transmission link 40 can include an Automotive Pixel Link (APIX). The APIX is designed in such a way that it meets special requirements in the vehicle environment; for example, the APIX has an increased temperature range and/or higher immunity to interference and/or lower electromagnetic emission compared to video transmission links used in private households.

Such an APIX thus allows reliable and cost-effective video signal transmission between the first unit 20 and the second unit 30 of the image processing system 10 of the vehicle.

For example, the video transmission link 40 includes a transmitter module, which has a first and a second interface. The first interface of the transmitter module is electrically coupled to a further interface of the first unit 20 in a predefined manner, for example. The second interface of the transmitter module is electrically coupled to a cable, for example, such as a shielded twisted pair cable. For example, the transmitter module is designed to read in, in parallel, three data words having a predefined number of bits, such as 8 bits, at the first interface thereof and to output these, serially, at the second interface thereof. The respective data word can represent one of three pixel values of a pixel of a video image in each case. With a transmission of video images that each have a resolution of 1020 pixels per line and an aspect ratio of 16:9 and that are represented at 60 Hz, approximately 1.5 Gbit/s must be transmitted with a serial transmission via the video transmission link 40.

For example, the video transmission link 40 further includes a receiver module, which has a first and a second interface. The first interface is electrically coupled to a further interface of the second unit 30 in a predefined manner. For example, the second interface is electrically coupled to the cable. The receiver module is designed, for example, to serially read in the transmitted data at the second interface thereof and to output, in parallel, the three data words having the predefined number of bits at the first interface thereof.

For example, the first unit 20 can include a key unit of an infotainment system of the vehicle. The key unit of an infotainment system in a motor vehicle is also referred to as the head unit.

The first unit 20 is designed to ascertain an uncompressed, transformed video image signal suitable for transmission via the video transmission link 40 as a function of a respective first video image signal in such a way that the transformed video image signal has the predefined data format of the video transmission link 40. The first video image signal represents respective uncompressed first video images B1 of a sequence of first video images B1, which are provided at a predefined frame rate and which in each case have a first image resolution having a predefined number of pixels, wherein in each case four pixel values are assigned to the respective pixels of the first video image B1.

For example, the first video image B1 can have three color channels and one alpha channel. For example, a first pixel value R representing a red color, a second pixel value G representing a green color, a third pixel value B representing a blue color, and a fourth pixel value A representing transparency are assigned to the respective pixel of the first video image B1.

The first unit 20 is furthermore designed to generate the first video image signal, for example. For example, the first unit 20 can be designed to carry out an image synthesis, also referred to as rendering, and can thus be designed to generate video images from raw data. The raw data can include a virtual spatial model defining objects and the material properties thereof, light sources, and the position and viewing direction of an observer. Moreover, the first unit 20 can be designed to ascertain image meta-information. The image meta-information can include substitute geometry data, so-called bounding boxes, for three-dimensional objects, for example.

The second unit 30 can include a head-up display control unit, for example, for a head-up display and/or a combination instrument of the vehicle. A visual output device 50, such as a display, is assigned to the second unit 30, for example. The second unit 30 can be coupled in terms of signaling to the visual output device 50, such as by way of a further video transmission link 55, which is designed equivalent to the video transmission link 40.

The second unit 30 is designed to again ascertain the first video image signal as a function of the transformed video image signal received via the transmission link.

For example, the second unit 30 is further designed to ascertain an overall video image signal as a function of the first video image signal, which has been ascertained again, and a second video image signal. The second video image signal represents respective second video images B2 of a sequence of second video images B2, which are provided at a predefined second frame rate and which in each case have a second image resolution having a predefined second number of pixels. In each case, three pixel values are assigned to the respective pixels of the second video image B2. The overall video image signal is ascertained in such a way that the overall video image signal represents respective image-in-image video images B3 of a sequence of image-in-image video images B3.

For example, the second video image B2 can have three color channels. For example, the first pixel value R representing the red color, the second pixel value G representing the green color and the third pixel value B representing the blue color can be assigned to the respective pixel of the second video image B2.

The second unit 30 can furthermore be designed to generate the second video image signal. As an alternative or in addition, a further unit can be designed to generate the respective second video image signals and transmit these to the second unit 30.

Moreover, the image processing system 10 can have a network connection 70 between the first unit 20 and the second unit 30. The network connection 70 can be designed as an Ethernet connection, for example. The network connection 70 can allow further image information to be exchanged between the first unit 20 and the second unit 30. For example, it may be provided that the image meta-information ascertained by the first unit 20 is forwarded via the network connection 70 to the second unit 30.

Figure 2:
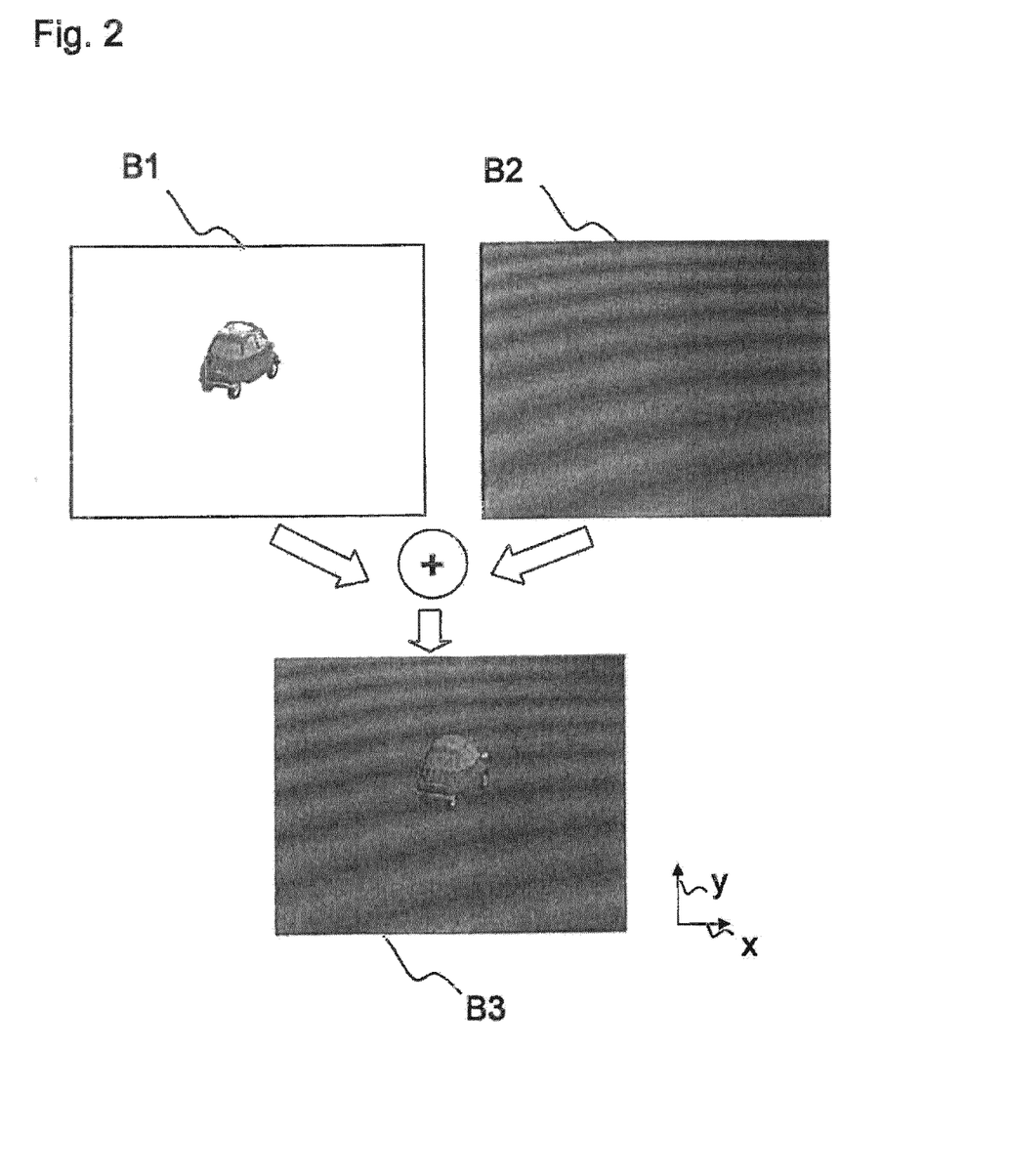
FIG. 2 shows an image-in-image video image resulting from a first and a second video image.

FIG. 2 shows, by way of example, in each case one of the first video images B1 and one of the second video images B2 from a sequence of first video images B1 and a sequence of second video images B2, and the image-in-image video image B3 resulting from the first video image B1 and the second video image B2.

The first video image B1 shows a three-dimensional automobile model. The second video image B2 shows a three-dimensional scene including a ground area. For example, the first video image B1 and the second video image B2 have the same resolution, which is to say a number of pixels in a horizontal direction x and a number of pixels in a vertical direction y are the same in each case in the first video image B1 and the second video image B2. The automobile model is surrounded by a transparent background, for example. The first video image B1 was generated by the first unit 20, for example, and transmitted via the video transmission link 40 to the second unit 30. The second video image B2 was generated by the second unit 30, for example.

The second unit 30 is designed, for example, to ascertain the overall video signal in such a way that a weighting of an overlay of the respective pixels of the first video image B1 and of the second video image B2 is carried out as a function of the fourth pixel values of the first video image B1 representing the transparency. This makes it possible that no transitions between the respective first video image B1 and the respective second video image B2 are visible to the observer in the shown image-in-image video image B3.

If the automobile model and the ground area involve three-dimensional objects, for example, it can be advantageous to use the same camera parameters for ascertaining the overall video image signal, which is to say during an image synthesis, as for the generation of the first video image signal.

Figure 3:
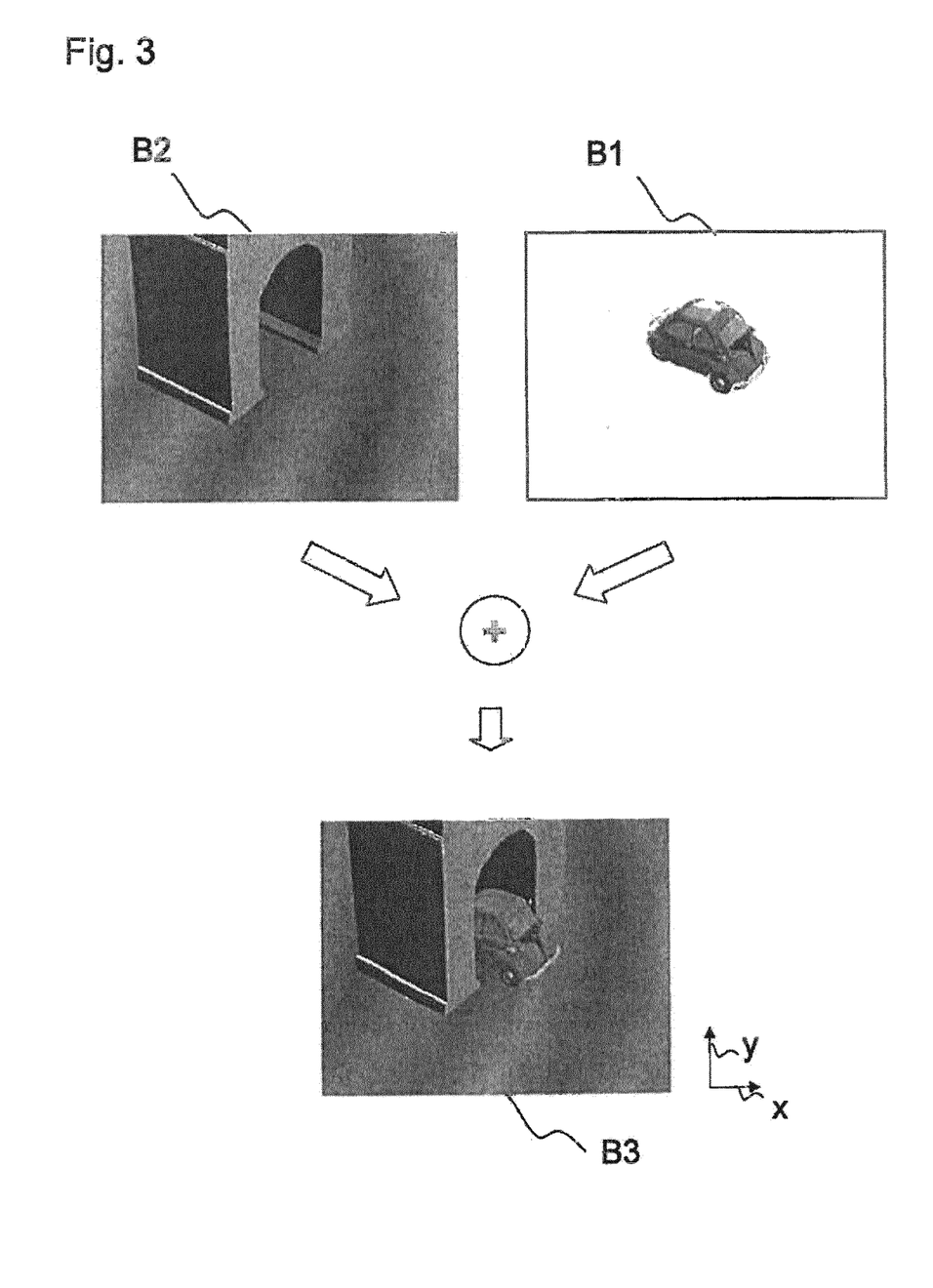
FIG. 3 shows an image-in-image video image resulting from a further first video image and a second video image.

FIG. 3 shows, by way of example, in each case one of the first video images B1 and one of the second video images B2 from a further sequence of first video images B1 and a further sequence of second video images B2, and the image-in-image video image B3 resulting from the first video image B1 and the second video image B2. The first video image B1 shows a three-dimensional automobile model. The second video image B2 shows a three-dimensional scene including an archway and a ground area. For example, the first video image B1 and the second video image B2 have the same resolution, which is to say a number of pixels in a horizontal direction x and a number of pixels in a vertical direction y are the same in each case in the first video image B1 and the second video image B2. The automobile model is surrounded by a transparent background, for example. The second unit 30 ascertains the overall video image signal representing the uncompressed image-in-image video image B3 as a function of the first video image signal of the first video image B1 and the second video image signal of the second video image B2. The objects partially overlap in the image-in-image video image B3. For a suitable three-dimensional depiction of the objects, it can be advantageous if, in this case, a substitute geometry also referred to as a bounding box, surrounding the automobile model is ascertained by the first unit 20, in addition to the actual image data, and if these data are transmitted on a supplementary basis via the network connection 70 to the second unit 30. The overall video image signal can then be ascertained as a function of the first video image signal, the second video image signal and the data regarding the substitute geometry.

Figure 4:
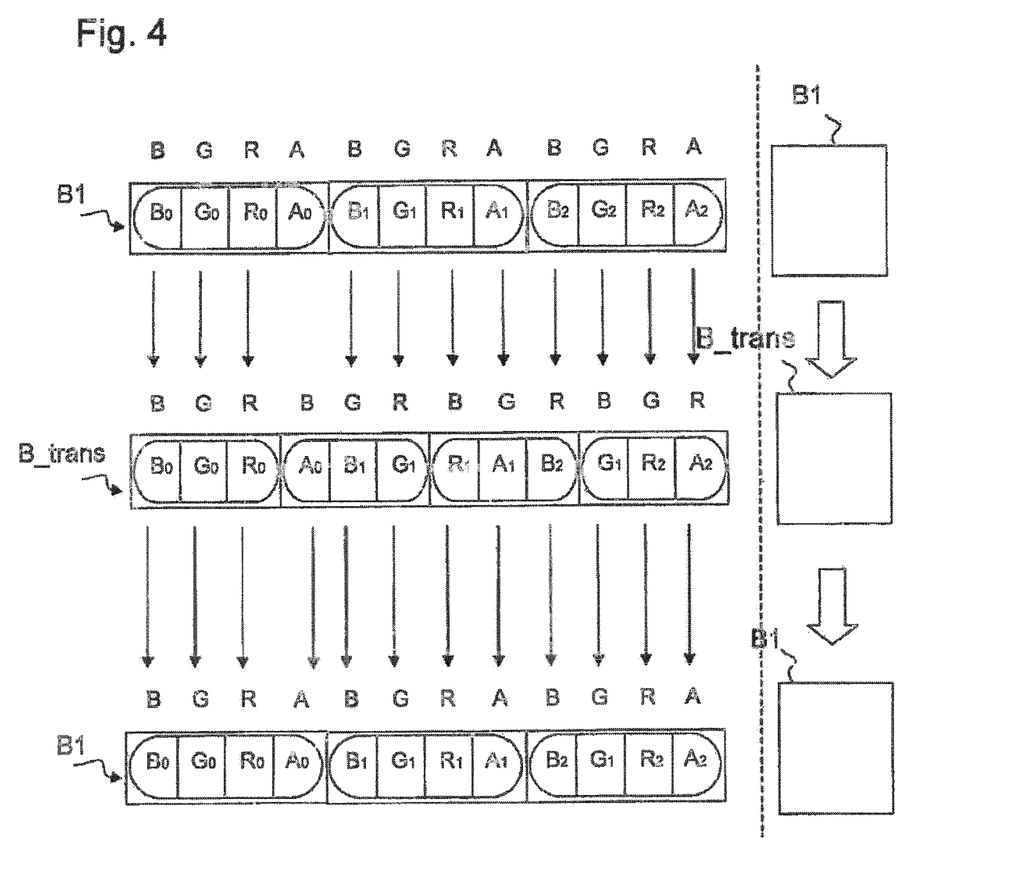
FIG. 4 is a diagram illustrating a pixel flow chart.

FIG. 4 is a schematic flow chart of the pixels, proceeding from the first video image B1 of the first unit 20 up to the further processing step of the first video image B1, which has been ascertained again, in the second unit 30.

For example, the pixel values provided with subscript, such as $B_0$, $G_0$, $R_0$ and $A_0$, represent the pixel values of a specific pixel of the first video image, such as of the first pixel of the first video image.

For example, the first unit 20 is designed to convert the respective first video image signal B1 into the transformed video image signal in such a way that the transformed video image signal represents a transformed video image B_trans, which has the same pixel values as the first video image B1 and a number of pixels greater by a factor of 4/3 than the first video image B1, and in which in each case three pixel values are assigned to the respective pixels of the transformed video image B_trans.

By way of example, FIG. 4 shows the pixel values for three pixels of the first video image B1. For example, the first unit 20 is designed to convert the respective first video image signal into the transformed video image signal in such a way that three consecutive pixels of the first video image B1 in each case are covered by four consecutive pixels of the transformed video image B_trans. For example, an order can be assigned to the pixel values of the first video image B1, and the first unit 20 is designed, for example, to convert the respective first video image signal into the transformed video image signal in such a way that the pixel values of the transformed video image B_trans have the same order.

The second unit 30 is designed to again ascertain the first video image signal as a function of the transformed video image signal received via the transmission link, such as by way of a back-transformation corresponding to the transformation of the first unit 20.

Figure 5:
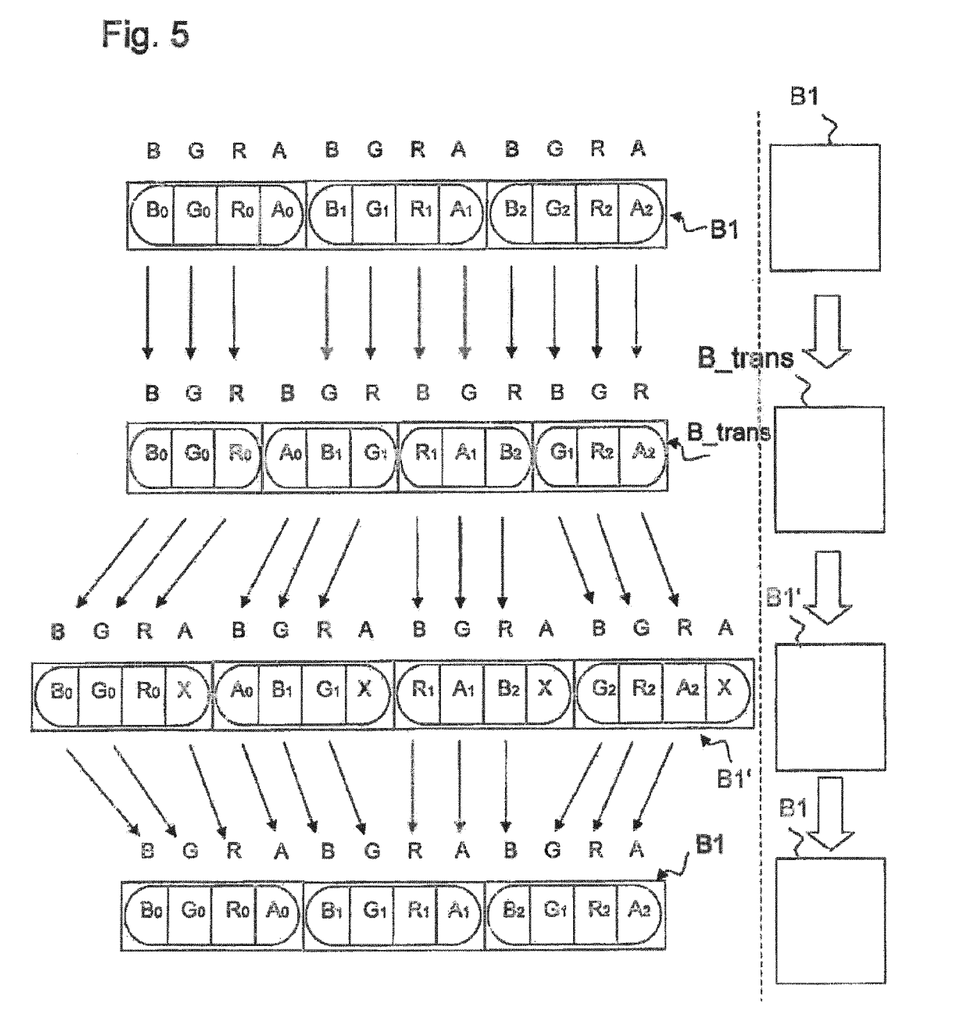
FIG. 5 is a diagram illustrating a further pixel flow chart.

FIG. 5 is a further schematic flow chart of the pixels, proceeding from the first video image B1 of the first unit 20 up to the further processing step of the first video image B1, which has been ascertained again, in the second unit 30.

Compared to the exemplary embodiment shown in FIG. 4, in this case the second unit 30 is designed to convert the received transformed video image signal into a preliminary first video image signal in such a way that the preliminary first video image signal represents preliminary first video images B1', wherein in each case three consecutive pixels of the transformed video image B_trans are covered by three consecutive pixels of the preliminary first video image B1'. The respective pixels of the preliminary first video image BF are enhanced by one further pixel value, which has the same value for all pixels, for example. In this case, for example, the second unit 30 is designed to ascertain the first video image signal as a function of the preliminary first video image signal by way of a filter known as a shader.

LIST OF REFERENCE NUMERALS AND SYMBOLS 10 image processing unit
20 first unit
30 second unit
40 video transmission link
50 visual output device
55 further video transmission link
70 network connection
A fourth pixel value
B third pixel value
B_trans transformed video image
B1 first video image
B1' preliminary first video image
B2 second video image
B3 image-in-image video image
G second pixel value
R first pixel value
x horizontal direction
y vertical direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An image processing system for a vehicle, comprising:
    a first unit,
    a second unit,
    a video transmission link which couples the first unit and the second unit, in terms of signaling, for transmitting digital video data, wherein
    the video transmission link is configured to transmit digital video image signals having a predefined data format for a respective pixel of a video image, the predefined data format comprising three blocks, each having a predefined number of bits;
    the first unit is configured to ascertain an uncompressed transformed video image signal suitable for transmission via the video transmission link as a function of a respective first video image signal such that the transformed video image signal has the predefined data format of the video transmission link, the first video image signal representing respective uncompressed first video images (B1) of a sequence of first video images (B1), which are provided at a predefined frame rate and which in each case have a first image resolution having a predefined number of pixels, in each case four pixel values being assigned to the respective pixels of the first video image (B1); and
    the second unit is configured to again ascertain the first video image signal as a function of the transformed video image signal received via the transmission link.

2. The image processing system according to claim 1, wherein:
    a first pixel value (R) representing a red color, a second pixel value (G) representing a green color, a third pixel value (B) representing a blue color, and a fourth pixel value (A) representing transparency are assigned to the respective pixel of the first video image (B1).

3. The image processing system according to claim 1, wherein:
    the second unit is configured to ascertain an overall video image signal as a function of the first video image signal, which has been ascertained again, and a second video image signal,
    the second video image signal represents respective second video images (B2) of a sequence of second video images (B2), which are provided at a predefined second frame rate and which, in each case, have a second image resolution having a predefined second number of pixels, in each case three pixel values being assigned to the respective pixels of the second video image (B2); and
    the overall video image signal is ascertained such that the overall video image signal represents respective image-in-image video images (B3) of a sequence of image-in-image video images (B3).

4. The image processing system according to claim 2, wherein:
the second unit is configured to ascertain an overall video image signal as a function of the first video image signal, which has been ascertained again, and a second video image signal,
the second video image signal represents respective second video images (B2) of a sequence of second video images (B2), which are provided at a predefined second frame rate and which, in each case, have a second image resolution having a predefined second number of pixels, in each case three pixel values being assigned to the respective pixels of the second video image (B2); and
the overall video image signal is ascertained such that the overall video image signal represents respective image-in-image video images (B3) of a sequence of image-in-image video images (B3).

5. The image processing system according to claim 3, wherein:
the first pixel value (R) representing the red color, the second pixel value (G) representing the green color and the third pixel value (B) representing the blue color are assigned to the respective pixel of the second video image (B2).

6. The image processing system according to claim 5, wherein:
the overall video signal is ascertained such that a weighting of an overlay of the respective pixels of the first video image (B1) and of the second video image (B2) is carried out as a function of fourth pixel values of the first video image (B1) representing the transparency.

7. The image processing system according to claim 3, wherein:
the overall video signal is ascertained such that a weighting of an overlay of the respective pixels of the first video image (B1) and of the second video image (B2) is carried out as a function of fourth pixel values of the first video image (B1) representing the transparency.

8. The image processing system according to claim 1, wherein:
the first unit is configured to generate the first video image signal.

9. The image processing system according to claim 3, wherein:
the second unit is configured to generate the second video image signal.

10. The image processing system according to claim 1, wherein:
the first unit is configured to convert the respective first video image signal into the transformed video image signal such that the transformed video image signal represents a transformed video image (B_trans), which has the same pixel values as the first video image (B1) and a number of pixels greater by a factor of 4/3 than the first video image (B1), and in which in each case three pixel values are assigned to the respective pixels of the transformed video image (B_trans).

11. The image processing system according to claim 10, wherein:
the first unit is configured to convert the respective first video image signal into the transformed video image signal such that three consecutive pixels of the first video image (B1) in each case are covered by four consecutive pixels of the transformed video image (B_trans).

12. The image processing system according to claim 11, wherein an order is assigned to the pixel values of the first video image (B1), and the first unit (20) is configured to convert the respective first video image signal into the transformed video image signal such that the pixel values of the transformed video image (B_trans) have the same order.

13. A method of operating an image processing system for a vehicle, the image processing system including a first unit, a second unit, and a video transmission link coupling the first unit and the second unit in terms of signaling for transmitting digital video data, the video transmission link being configured to transmit digital video image signals having a predefined data format for a respective pixel of a video image, the predefined data format comprising three blocks, each block having a predefined number of bits, the method comprising the acts of:
ascertaining, via the first unit, an uncompressed transformed video image signal suitable for transmission via the video transmission link as a function of a respective first video image signal such that the transformed video image signal has the predefined data format of the video transmission link, the first video image signal representing respective uncompressed first video images of a sequence of first video images that are provided at a predefined frame rate and which, in each case, have a first image resolution having a predefined number of pixels, wherein, in each case, four pixel values are assigned to the respective pixels of the first video image;
transmitting the transformed video image signal over the video transmission link;
receiving, in the second unit, the transformed video image signal transmitted over the video transmission link; and
again ascertaining, via the second unit, the first video image signal as a function of the transformed video image signal received via the video transmission link.

14. The method according to claim 13, wherein
a first pixel value (R) representing a red color, a second pixel value (G) representing a green color, a third pixel value (B) representing a blue color, and a fourth pixel value (A) representing transparency are assigned to the respective pixels of the first video image (B1).

15. The method according to claim 14, further comprising the acts of:
ascertaining, via the second unit, an overall video image signal as a function of the first video image signal and a second video image signal, wherein
the second video image signal represents respective second video images (B2) of a sequence of second video images (B2), which are provided at a predefined second frame rate and which, in each case, have a second image resolution having a predefined second number of pixels, in each case three pixel values being assigned to the respective pixels of the second video image (B2); and
the overall video image signal is ascertained such that the overall video image signal represents respective image-in-image video images (B3) of a sequence of image-in-image video images (B3).

16. The method according to claim 15, further comprising the acts of:
generating the first video image signal via the first unit; and
generating the second video image signal via the second unit.

17. The method according to claim 16, further comprising the act of:
  converting, via the first unit, the respective first video image signal into the transformed video image signal such that the transformed video image signal represents a transformed video image, which has the same pixel values as the first video image and a number of pixels greater by a factor of 4/3 than the first video image, and in which, in each case, three pixel values are assigned to the respective pixels of the transformed video image.

18. The method according to claim 17, wherein
  the first unit is configured to convert the respective first video image signal into the transformed video image signal such that three consecutive pixels of the first video image (B1) in each case are covered by four consecutive pixels of the transformed video image (B_trans).

19. The method according to claim 18, wherein an order is assigned to the pixel values of the first video image (B1), and the first unit (20) is configured to convert the respective first video image signal into the transformed video image signal such that the pixel values of the transformed video image (B_trans) have the same order.

* * * * *